US008595089B1

(12) United States Patent
Roberts

(10) Patent No.: US 8,595,089 B1
(45) Date of Patent: Nov. 26, 2013

(54) SYSTEM AND METHOD FOR PREDICTING MISSING PRODUCT RATINGS UTILIZING COVARIANCE MATRIX, MEAN VECTOR AND STOCHASTIC GRADIENT DESCENT

(76) Inventor: William John James Roberts, Rockville, MD (US)

( * ) Notice: Subject to any disclaimer, the term of this patent is extended or adjusted under 35 U.S.C. 154(b) by 503 days.

(21) Appl. No.: 12/705,932

(22) Filed: Feb. 15, 2010

(51) Int. Cl.
 *G06Q 30/00* (2012.01)
(52) U.S. Cl.
 USPC .................... 705/26.7; 705/26.1; 705/347
(58) Field of Classification Search
 USPC ............... 705/7.29, 14.49, 14.51, 26.1, 26.7; 455/69; 706/12, 46; 347/1
 See application file for complete search history.

(56) References Cited

U.S. PATENT DOCUMENTS

| 4,996,642 | A | * | 2/1991 | Hey | 705/7.29 |
|---|---|---|---|---|---|
| 5,583,763 | A | * | 12/1996 | Atcheson et al. | 707/750 |
| 5,704,017 | A | * | 12/1997 | Heckerman et al. | 706/12 |
| 5,749,081 | A | * | 5/1998 | Whiteis | 1/1 |
| 5,790,426 | A | * | 8/1998 | Robinson | 702/179 |
| 5,945,988 | A | * | 8/1999 | Williams et al. | 715/747 |
| 6,064,980 | A | * | 5/2000 | Jacobi et al. | 705/26.7 |
| 6,092,049 | A | * | 7/2000 | Chislenko et al. | 705/7.29 |
| 6,236,974 | B1 | * | 5/2001 | Kolawa et al. | 705/7.32 |
| 6,370,513 | B1 | * | 4/2002 | Kolawa et al. | 705/7.33 |
| 6,496,816 | B1 | | 12/2002 | Thiesson | |
| 6,636,836 | B1 | * | 10/2003 | Pyo | 705/7.29 |
| 6,662,177 | B1 | * | 12/2003 | Martino et al. | 1/1 |
| 6,727,914 | B1 | * | 4/2004 | Gutta | 715/719 |
| 6,801,909 | B2 | * | 10/2004 | Delgado et al. | 1/1 |
| 7,075,000 | B2 | * | 7/2006 | Gang et al. | 84/600 |
| 7,082,365 | B2 | * | 7/2006 | Sheha et al. | 701/426 |
| 7,359,550 | B2 | * | 4/2008 | Brand | 382/181 |
| 7,475,027 | B2 | * | 1/2009 | Brand | 705/7.29 |
| 7,840,986 | B2 | * | 11/2010 | Ali et al. | 725/105 |
| 7,870,083 | B2 | * | 1/2011 | Zhu et al. | 706/12 |
| 8,037,080 | B2 | * | 10/2011 | Koren | 707/754 |
| 8,079,046 | B2 | * | 12/2011 | Ali et al. | 725/46 |
| 8,131,732 | B2 | * | 3/2012 | Yu et al. | 707/748 |
| 2003/0130983 | A1 | * | 7/2003 | Rebane | 707/1 |
| 2004/0103092 | A1 | * | 5/2004 | Tuzhilin et al. | 707/3 |
| 2004/0158497 | A1 | * | 8/2004 | Brand | 705/26 |
| 2006/0020614 | A1 | * | 1/2006 | Kolawa et al. | 707/100 |
| 2006/0190225 | A1 | * | 8/2006 | Brand | 703/2 |
| 2007/0150428 | A1 | * | 6/2007 | Webb | 706/46 |
| 2009/0099984 | A1 | * | 4/2009 | Zhu et al. | 706/12 |
| 2009/0299996 | A1 | * | 12/2009 | Yu et al. | 707/5 |
| 2010/0030764 | A1 | * | 2/2010 | Koren | 707/5 |

OTHER PUBLICATIONS

Yilun Chen1, Yuantao Gu2, Alfred O. Hero III; Sparse LMS for System Identification; 2009; Department of EECS, University of Michigan, Ann Arbor, MI 48109-2122, USA; Department of EE, Tsinghua University, Beijing 100084, P.R. China.*
Lim, Yew Jin et al., Variational Bayesian Approach to Movie Rating Prediction ACM, KDDCup'07, Aug. 12, 2007.*
Lipcon, Todd, Algorithms for Collaborative Prediction Brown University, Thesis, May 2007.*

(Continued)

*Primary Examiner* — Scott L Jarrett
(74) *Attorney, Agent, or Firm* — Attentive Law; Paul Ratcliffe

(57) ABSTRACT

A product recommender system where product ratings from a plurality of users are represented as plurality of vectors is disclosed. The ratings vectors are represented by a mean vector and a covariance matrix. The mean vector and the covariance matrix are estimated from a data-set of known product ratings. Product ratings are predicted using the mean vector and the covariance matrix.

11 Claims, 4 Drawing Sheets

(56) References Cited

OTHER PUBLICATIONS

Sarwar, Badrul et al., Incremental Value Decomposition Algorithms for Highly Scalable Recommender Systems Fifth International Conference on Computer and Information Science, 2002.*

Omlin, Martin et al., A comparison of techniques for estimation of model prediction uncertainty Ecological Modelling, vol. 115, 1999.*

Zhang, Tong, Solving Large Scale Linear Prediction Problems Using Stochastic Gradient Descent Algorithms Proceedings of the 21st International Conference on Machine Learning, 2004.*

Marlin, Benjamin, Collaborative Filtering: A Machine Learning Perspective University of Toronto, Thesis, 2004.*

Gokhale, Anuja, Improvements to Collaborative Filtering Algorithms Worcester Polytechnic Institue, Theses, May 1999.*

Mean Vector and Covarian Metric -definition Engineering Statistics Notebook, National Institute of Standards and Technology, Retrieved Dec. 18, 2012.*

Brand, Matthew, Fast Online SVD revisions for lightweight recommender systems Mitsubishi Electric Infofmraiton Technology Center, MERL, Mar. 2003.*

Sarwar, Badrul Munir, Sparsity, Scalability and Distribution in Recommender Systems University of Minnesota, Thesis, Jan. 2001.*

Baudisch, Patrick, Dynamic Information Filtering GMD Research Series, Feb./Mar. 2001.*

Billsus, Daniel et al., Learning Collaborative Information Filters Proceedings of the 15th International Conference on Machine Learning, 1998.*

Schwaighofer, Anton et al., Learning Gaussian Process Kernels via Hiearchical Bayes Advances in Neural Information Processing Systems, vol. 17, MIT Press, 2005.*

Takacs, Gabor et al., Scalable Collaborative Filtering Approaches for Large Recommender Systems Journal of Machine Learning Research, vol. 10, Mar. 2009.*

Umyarov, Ahmed et al., Improving Collaborative Filtering Recommendations Using External Data Eighth IEEE International Conference on Data Mining, ICDM, 2008.*

Schweder, Simen Gan, Recommender Systems and the Netflix price University of Oslo, Thesis, Nov. 2008.*

D. W. McMichael, "Estimating Gaussian mixture models from data with missing features," Proc. 4th Int. Symp. Sig. Proc. and its Apps., Gold Coast, Australia, Aug. 1996, pp. 377-378.

F. Bohnert, D. F. Schmidt, and I. Zukerman, "Spatial processes for recommender systems," Proc. of the 21st Intl. Joint Conf. on Artificial Intilligence, Pasadena, CA, 2009.

A. Schwaighofer, V. Tresp, and K. Yu, "Learning Gaussian process kernels via hierarchical Bayes," Advances in Neural Information Processing Systems, vol. 17, pp. 1209-1216, 2005.

N. D. Lawrence and R. Urtasum, "Non-linear matrix factorization with Gaussian processes,"Proc. 26th Annual Inter. Conf. Machine Learning, Montreal, Quebec, Canada, 2009, pp. 601-608.

W. J.J. Roberts, "Application of a Gaussian, missing-data model to product recommendation," IEEE Signal Processing Letters, vol. 17, No. 5, pp. 509-512, May 2010.

* cited by examiner

|  | User 1 | User 2 | ... | User n |
|---|---|---|---|---|
| Product 1 | $y_1(1)$ |  | ... | $y_n(1)$ |
| Product 2 | $y_1(2)$ | $y_2(2)$ | ... |  |
| ⋮ |  |  |  |  |
| Product k | $y_1(k)$ |  | ... | $y_n(k)$ |

101

|  | Tony | Mike |
|---|---|---|
| Titanic | 4 | 1 |
| Star Wars | 2 |  |
| The Godfather | 3 |  |
| Jaws |  | 3 |
| Independence Day |  |  |

201

SYSTEM AND METHOD FOR PREDICTING MISSING PRODUCT RATINGS UTILIZING COVARIANCE MATRIX, MEAN VECTOR AND STOCHASTIC GRADIENT DESCENT

CROSS REFERENCE TO RELATED APPLICATION

None.

BACKGROUND OF THE INVENTION

1. Field

The application relates to computer-based methods and apparatus for recommender systems.

2. Prior Art

A recommender system can be used to predict preferences of users for products. Consider a recommender system involving a plurality of products rated by a plurality of users. An observed rating is a rating of one of the products that has been made by one of the users. If a particular user has not yet rated a particular product then that rating is a missing rating. The product recommendation problem is to predict missing ratings.

For example, a user named Tony has rated three movies: Titanic as 4 stars, Star Wars as 2 stars, and The Godfather as 3 stars. Tony has not rated Independence Day and Jaws. A user named Mike has rated Titanic as 1 star and Jaws as 3 stars. Mike has not rated Star Wars, The Godfather or Independence Day. The set of Tony's observed ratings thus consists of his ratings of Titanic, Star Wars, and The Godfather. Mike's observed ratings thus consist of his ratings for Titanic and Jaws. The goal of movie recommendation to accurately predict the missing ratings which constitute the ratings Tony would give to Independence Day and Jaws and the ratings Mike would give to Star Wars, The Godfather and Independence Day.

A set of product ratings can be represented as a data-matrix, where some entries of the data-matrix are undefined. Let k denote the number of products and let n denote the number of users. In the movie example above k= and n=2. Let $y_i(j)$ denote the observed rating of the jth product by the ith user. Let $y_i$ denote all observed ratings from the ith user. The data-matrix is the set of all observed ratings from all users and can be represented as 101 in FIG. 1. Positions in the data-matrix corresponding to missing ratings have no assigned value. A data-matrix for the movie example above is illustrated is 201 in FIG. 2.

Performance of recommender systems is generally measured using a Root Mean Squared Error (RMSE). The RMSE measures a difference between a predicted rating and an actual observed rating.

In addition to movies there are many other products whose ratings are able to be predicted by recommender systems, e.g. book and television shows. Recommender systems are applicable in Internet dating sites to predict how users will rate potential mates. Grocery stores can use recommender systems to predict buying habits of shoppers. Recommender systems are applicable in medicine. Consider a plurality of drugs and a plurality of patients. Consider a patient who has responded well to some drugs but not others. A response by a patient to a drug is akin to a rating of that drug by the patient. Recommender systems can thus be applied to predict drugs the patient will respond well to.

Recommender systems are currently an active area of research. A matrix factorization approach currently stands out for large-scale, real-world, recommender systems. In the matrix factorization approach, an integer l is first chosen. A data-matrix 101 of size k×n is then approximated by a product of a left matrix 301 of size k×l and a right matrix 302 of size l×n. The left matrix 301 and right matrix 302 are generally estimated to minimize an error measure between their product and the data matrix 101. Once these matrices have been estimated, missing ratings of a particular user are predicted by an inner product of appropriate columns and rows from the left matrix 301 and the right matrix 302. For example, $y_i(j)$ is predicted by the dot product of the ith row of the left matrix 301 and the jth column of the right matrix 302.

The matrix factorization approach has a number of disadvantages. A variety of approaches for estimation of the left matrix 301 and the right matrix 302 are in general use. These approaches result in different values for the left matrix 301 and the right matrix 302. Hence performance of these approaches varies. Little guidance in selection of the integer l is available. Generally a variety of values of l need to be tried. In many cases a large l performs best. A large l, however, means that the left matrix 301 and the right matrix 302 are also very large and finding these matrices becomes computationally expensive. Once the left matrix 301 and the right matrix 302 have been estimated it is generally difficult to add new products or new users without re-estimating the left matrix 301 and the right matrix 302. The matrix factorization approach generally yields performance that is often too low for many applications. A number of heuristic methods have been proposed to increase performance. One way is to average predictions obtained using slightly different training approaches and/or different values of l. This method is generally too cumbersome for practical application. Performance of matrix factorization may be increased by applying a combination of pre-processing, post-processing and data manipulation steps. Such steps are generally heuristic in nature and may only work on particular data-sets. For example, subtraction of a global mean may improve performance for movie recommendation but not for a dating site.

A need exists for a method and apparatus that achieves high performance without the disadvantages of the matrix factorization approach. The method and apparatus should be able to add new products and new users without requiring extensive re-calculations. The method and apparatus should be able to achieve high performance without requiring averaging of many predictions. The method and apparatus should not rely on heuristic data manipulations to achieve high performance.

SUMMARY

The disadvantages of the prior-art are alleviated to a great extent by a method and apparatus for product recommendation comprising an estimation step whereby a mean vector and a covariance matrix are estimated from the data-matrix 101;

a prediction step whereby a missing product rating is predicted using the mean vector and the covariance matrix.

Embodiments for the estimation step whereby the mean vector and the covariance matrix are estimated from the observed data are first specified. Let μ denoted the k×1 mean vector and let R denote the k×k covariance matrix. If all ratings are observed and none are missing the mean and covariance can be estimated using standard techniques. For example, without missing ratings the mean vector can be estimated by an arithmetic mean, $\mu=(1/n)\sum_{i=1}^{n} y_i$. Without missing ratings the covariance matrix can be estimate using a sample covariance $R=(1/n)\sum_{i=1}^{n} y_i y'_i$ where $y'_i$ represents the transpose of $y_i$.

Missing ratings complicate the estimation step. The arithmetic mean and the sample covariance are no longer appropriate when some ratings are missing. In one embodiment, equations developed theoretically to estimate the mean vector and the covariance matrix with missing data are applied here. These equations have not been used previously in real-world applications.

Once the mean vector and covariance matrix have been estimated then the prediction step predicts missing ratings. In one embodiment the prediction step uses a Minimum Mean Squared Error (MMSE) predictor. The MMSE predictor minimizes a theoretical squared difference between predicted ratings and their true, but unknown values.

The embodiments disclosed here achieve high performance without requiring averaging of predictions from multiple systems. Furthermore it is straightforward to add new products and new users. The embodiments disclosed here do not rely on heuristic data manipulations to achieve high performance.

BRIEF DESCRIPTION OF THE DRAWINGS

The method and apparatus will now be described in more detail, by way of example only, with reference to the accompanying drawings, in which.

DRAWINGS

Reference Numerals

Figures 1, 2, 3:
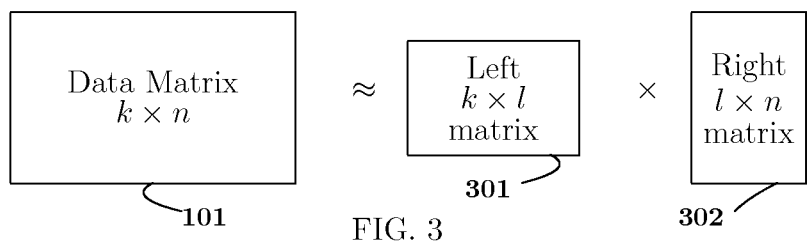
FIG. 1 shows the data-matrix consisting of all observed ratings from all users.
FIG. 2 shows an example of a data-matrix.
FIG. 3 shows the prior-art matrix factorization approach.

101 Data-matrix of size k×n
201 Example of a data matrix
301 Left matrix of size k×l
302 Right matrix of size l×n
401 User 1
402 User 2
403 Internet
404 Hard Disk Drive
405 Central Processing Unit
406 Random Access Memory
501 Estimation sub-step to initialize mean vector and covariance matrix
502 Estimation sub-step to update mean vector and covariance matrix
503 Estimation sub-step to check for convergence
504 Estimation sub-step to store mean and convergence
601 Prediction sub-step to retrieve mean and covariance
603 Prediction sub-step to predict missing products ratings for the given user
602 Prediction sub-step to retrieve observed product ratings from the given user

DETAILED DESCRIPTION

Figure 4:
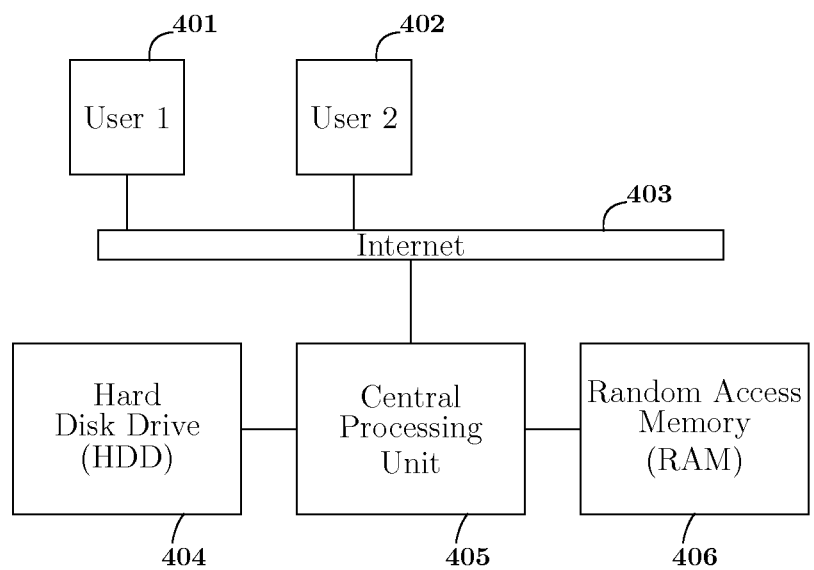
FIG. 4 shows a recommender system and its connection via the Internet to users.

FIG. 4 shows a recommender system and its connection via Internet 403 to users 401 and 402. A Central Processing Unit (CPU) 405 retrieves and stores data to and from a Hard Disk Drive (HDD) 404 and Random Access Memory (RAM) 406. For example, the data-matrix 101 is stored on the HDD 404 but is copied to RAM 406 during the estimation step and the prediction step. After the estimation step is complete the mean and covariance are copied from RAM 406 to the HDD 404. The prediction step occurs when a user, e.g. user 401, requests prediction of his or her missing ratings. This would occur, for example, when the user 401 request a movie recommendation. In the prediction step the mean and covariance are copied from the HDD 404 to RAM 406. In RAM 406 the mean and covariance are used to prediction the requested missing ratings.

Figure 5:
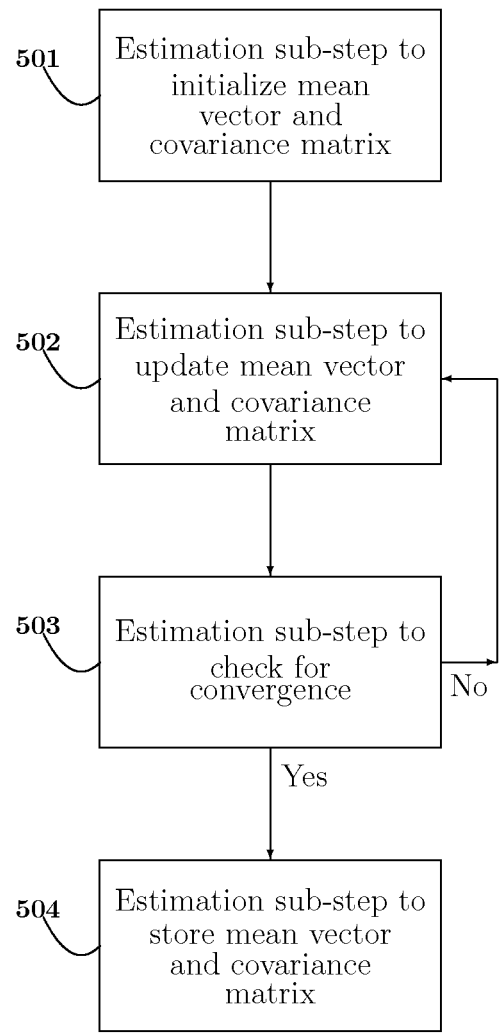
FIG. 5 is a flow chart of one embodiment of the estimation step.

FIG. 5 is a flow chart representing the operation of the estimation step. Sub-steps within the estimation step are now specified.

Estimation Sub-Step to Initialize Mean Vector and Covariance Matrix 501

A recommender system starts without a mean vector nor covariance matrix and these quantities must be assigned to an initial value using the data-matrix 101. In one embodiment, the initial value of the mean vector is provided by an arithmetic mean of the observed ratings. In one embodiment the initial value of the covariance matrix is provided by a novel matrix that has non-zero off-diagonal elements and diagonal elements equal to sample variances.

Mathematical formula for initialization of the mean vector and the covariance matrix are now presented. As before, let $\mu$ denote the mean vector and, let R denote the covariance matrix, and let $y_t$ be observed ratings from a tth user, where t is an integer from 1 to n. Let $k_t$ be the number of ratings provided by the tth user, where $0 \leq k_t \leq k$. Let I be a k×k identity matrix. Let $H_{y_t}$ be a $k_t$×k matrix given by I with rows corresponding to indices of missing ratings from the tth user deleted. Let N be a k×k diagonal matrix given by $N = \sum_{t=1}^{n} H'_{y_t} H_{y_t}$, where ' denotes vector or matrix transpose as appropriate. $H_{y_t}$. Elements along the diagonal of N thus equal numbers of times each product was rated. The mean vector is initialized by $\mu = N^{-1} \sum_{t=1}^{n} H'_{y_t} y_t$. Definite a matrix $S = \sum_{t=1}^{n} H'_{y_t} (y_t - H_{y_t} \mu)(y_t - H_{y_t} \mu)' H_{y_t}$ constituting an un-normalized sample covariance matrix. The covariance matrix is initialized by R $N^{-1/2} S N^{-1/2}$.

Thus the input to sub-step 501 is the data-matrix 101. The output of the sub-set 501 are initial estimates of the mean vector and covariance matrix.

Estimation Sub-Step to Update Mean Vector and Covariance Matrix 502

Performance is improved by updating any existing mean vector and covariance using Maximum Likelihood (ML) theory. An existing mean vector and covariance matrix could have be obtained from the initialization sub-step 501, or from an earlier executing of sub-step 502. In the latter case sub-step 502 is continuously executed until convergence criteria are satisfied.

With missing ratings, a ML estimate is a closed form expression given by $$\mu = \left( \sum_{t=1}^{n} H'_{y_t} R_{y_t}^{-1} H_{y_t} \right)^{-1} \sum_{t=1}^{n} H'_{y_t} R_{y_t}^{-1} y_t \quad (1)$$

where $R_{y_t} = H_{y_t} R H'_{y_t}$.

No such closed-form ML estimate of the covariance matrix is known. Thus, existing values of the covariance matrix are updated using a modified gradient descent algorithm given by $$R = R + \gamma R \left( \sum_{t=1}^{n} H'_{y_t}(R_{y_t}^{-1} - R_{y_t}^{-1}(y_t - \mu_{y_t})(y_t - \mu_{y_t})'R_{y_t}^{-1})H_{y_t} \right) R \quad (2)$$

where $\mu_{y_t} = H_{y_t}\mu$ and $\gamma > 0$ is a predetermined constant.

Thus the input to sub-step 502 of the estimate step is the data-matrix 101 and existing estimates of the mean vector and the covariance matrix. The output of the sub-set 502 are updated estimates of the mean vector and covariance matrix.
Estimation Sub-Step to Check for Convergence 503

In one embodiment, the mean vector and the covariance matrix are continuously updated in the estimation step until convergence criteria are satisfied. A likelihood is given by $$p(y^n; \mu, R) = \prod_{t=1}^{n} \frac{\exp -(y_t - \mu_{y_t})'R_{y_t}^{-1}(y_t - \mu_{y_t})/2}{(2\pi)^{k_t/2}|R_{y_t}|^{1/2}} \quad (3)$$

where $y^n = \{y_1, \ldots, y_n\}$ represents all observed product ratings in the data-matrix 101. In one embodiment, a convergence criterion is satisfied once changes in a likelihood calculated using successive estimates of the mean and covariance are sufficiently small. In this case a Boolean flag is set to indicate that convergence has occurred and sub-step 504 is executed. Otherwise the Boolean flag is not set and sub-step 502 is re-executed.

Thus the input to sub-step 503 is the data-matrix 101, updated estimates of the mean vector and the covariance matrix, and a likelihood of previous estimates of the mean and the covariance. The output of the sub-step 503 is the Boolean flag which represents whether convergence has occurred or not.
Estimation Sub-Step to Store Mean and Covariance Matrix 504

In the estimation step the mean and covariance are generally processed in RAM 406. Once the estimation step has converged the mean and covariance are stored on the HDD 404.

Figure 6:
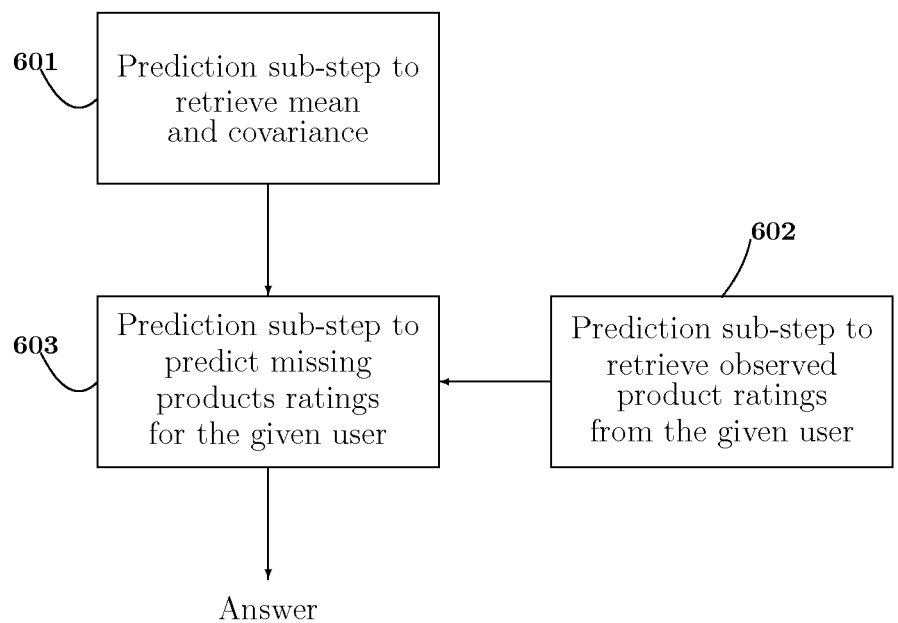
FIG. 6 is a flow chart of one embodiment of the prediction step.

FIG. 6 is a flow chart of the operation of one embodiment of the prediction step. In the prediction step the mean and covariance are used to predict missing ratings. Sub-steps within the prediction step are now specified.
Prediction Sub-Step to Retrieve Mean and Covariance Matrix 601

In sub-step 601 the mean and covariance are copied from the HDD 404 into RAM 406. Thus the output of sub-step 601 are copies of the mean and covariance in RAM 406.
Prediction Sub-Step to Retrieve Observed Product Ratings from the Given User 602

Once a particular user, e.g. 401, generates a request for prediction of missing ratings, the particular user's observed ratings are retrieved from the HDD 404 and copied into RAM 406.

Thus the output of sub-step 602 of the prediction step are copies of a users observed ratings in RAM 406.
Prediction Sub-Step to Predict Required Missing Product Ratings for the Given User 603

Sub-step 603 provides a final answer of the disclosed method and apparatus. This final answer constitutes a prediction of a plurality of required missing product ratings for a given user. Let z denote a plurality of observed ratings from the given user. Let $\hat{x}$ be the prediction of the missing product ratings of the given user. In one embodiment this prediction is obtained by $$\hat{x} = R_{xz}R_z^{-1}(z - \mu_z) + \mu_x \quad (4)$$

where $R_{xz}$, $R_z$, $\mu_x$, and $\mu_z$ are appropriate sub-matrices and sub-vectors from, respectively, the mean vector and the covariance matrix. We now specify these. Let $H_z$ be a matrix given by I with rows corresponding to indices of missing ratings from z deleted. Let $H_x$ be a matrix given by I with rows corresponding to indices of missing ratings from $\hat{x}$ deleted. Then $R_{xz} = H_x R H'_z$, $R_z = H_z R H'_z$, $\mu_x = H_x \mu$, and $\mu_z = H_z \mu$.

Thus the input to sub-step 603 are the mean vector and the covariance matrix and the observed ratings of a given user. The output of the sub-step 603 is the prediction of the particular user's missing data.
Implementation In one embodiment implementation can be performed in a programming language such a Matlab or C or any other programming language. The programming language can be augmented by using Basic Linear Algebra Subprograms (BLAS). For efficient memory usage BLAS routines can operate on a designated memory location in random access memory (RAM) 406. The designated memory can be large enough to hold a k×k matrix. The designated k×k memory location can hold a $k_t \times k_t$ matrix when processing observations from a tth user.

To illustrate the sequence of BLAS routines consider, for example, an iteration of sub-step 502. For observed ratings from the tth user, a matrix $R_{y_t} = H_{y_t} R H'_{y_t}$ can be formed by copying relevant elements of the covariance matrix into the designated memory location. In this and other similar operations matrix multiplications are not required. A matrix $R_{y_t}$ can be overwritten by its upper triangular Cholesky decomposition $U_{y_t}$ where $R_{y_t} = U_{y_t} U'_{y_t}$. Cholesky decomposition can be performed using a BLAS routine called "spotrf." A BLAS routine called "strsm" can be used to calculate $U_{y_t}^{-1}(y_t - \mu_{y_t})$, followed by a another call to "strsm" to calculate $R_{y_t}^{-1}(y_t - \mu_{y_t})$. In a similar fashion two calls to "strsm" can be used to calculate $R_{y_t}^{-1} y_t$. A matrix $R_{y_t}^{-1}(y_t - \mu_{y_t})(y_t - \mu_{y_t})'R_{y_t}^{-1}$, can be calculated using a BLAS routine called "ssyrk". A matrix $R_{y_t}^{-1}$ can be calculated using a BLAS called "spotri".

The BLAS function calls can also be used to calculate the quantities in sub-step 503. A scalar $(y_t - \mu_{y_t})R_{y_t}^{-1} t(y_t - \mu_{y_t})$, required can be calculated by squaring and summing the elements of $U_{y_t}^{-1}(y_t - \mu_{y_t})$. A required determinant can be calculated using the identity $\log|R_{y_t}| = 2\Sigma_j \log((U_{y_t})_{jj})$ where $(U_{y_t})_{jj}$ is the jjth element of $U_{y_t}$.

Alternative Embodiments

Estimation Sub-Step to Initialize Mean Vector and Covariance Matrix 501

In yet other embodiments, different initializations for the covariance matrix can be used. For example, a simple initialization is R=I where I is a k×k identity matrix. Another alternative is a diagonal matrix whose elements correspond to sample variances of the observed ratings. The covariance matrix is thus $R = N^{-1}$ diag(S) where diag(S) is a diagonal matrix consisting of a diagonal elements of S. Another alternative is $R = \text{diag}(S)^{-1/2} S \text{diag}(S)^{-1/2}$. Note that off-diagonal elements of this matrix are non-zero.
Estimation Sub-Step to Update Mean Vector and Covariance Matrix 502

Additional embodiments in the form of alternative methods to update the covariance matrix are possible. For example, a method based on an Expectation Maximization (EM) algorithm is possible. Iterations of the EM algorithm are guaranteed to not decrease the likelihood. Let $X_t$ denote a (k−k_t)-dimensional random vector representing all missing ratings of the tth user. Let $H_{x_t}$ be a $(k-k_t) \times k$ matrix given by I with rows corresponding to the indices of the observed ratings deleted. The conditional mean prediction of all missing ratings is given by $$\hat{X}_t = R_{x_t y_t} R_{y_t}^{-1}(y_t - \mu_{y_t}) + \mu_{x_t} \qquad (5)$$

where $R_{x_t y_t} = H_{x_t} R H_{y_t}$, $\mu_x = H_x \mu$ and $\mu_y = H_y \mu$. Then the EM iteration that provides the updated covariance matrix estimate is given by $$R = \frac{1}{n}\sum_{t=1}^{n}(\hat{Z}_t - \mu)(\hat{Z}_t - \mu)' + H_{x_t}(R_{x_t} - R_{x_t y_t} R_{y_t}^{-1} R'_{x_t y_t})H'_{x_t} \qquad (6)$$

where $\hat{Z}_t = H'_{y_t} y_t + H'_{x_t} \hat{X}_t$ and $R_{x_t} = H_{x_t} R H'_{x_t}$. Note that the EM approach can be applied to calculate the mean vector resulting in $\mu = \Sigma_t \hat{Z}_t/n$.

In another embodiment the sub-steps 502 and 503 are dispensed with. In this embodiment the initial values of the mean vector and covariance matrix from 501 are used in the prediction step.

Estimation Sub-Step to Check for Convergence 503

Alternative embodiments in the form of different convergence criteria are possible. For example iterations can be ceased once changes in the covariance matrix and mean vector are sufficiently small. In another example, iterations can be ceased once a change in RMSE is sufficiently small. In another example, iterations can be ceased after an arbitrary number of iterations.

Calculation of Confidence

Alternative embodiments that calculate a confidence in the predictions are possible. Variation in the predictions can be measured using a partial covariance matrix. The partial covariance matrix is given by $$R_{x_t} - R_{x_t y_t} R_{y_t}^{-1} R'_{x_t y_t} \qquad (7)$$

The partial covariance matrix provides a measure of the quality of the prediction. This information could be applied in movie recommendation or in any other application of recommender systems. For example, a (1-α) two-sided confidence interval for the ith element of $X_t$, denoted $X_t(i)$, is given by $\hat{X}_t(i) + \sigma_{ii} z_{1-\alpha/2}$ where $\sigma_{ii}^2$ is the ith diagonal element of the appropriate partial covariance matrix and $z_{1-\alpha/2}$ is the quantile of the standard Gaussian distribution evaluated at (1-α/2). Alternatively, a confidence ellipsoid for $X_t$ can be constructed.

Adding New Movies and Users

Alternative embodiments that provide ability to add new products and new users are possible. Prediction of ratings for new users can be performed using the existing values of the mean and covariance. No re-estimation is required. A new product can be added to the system by increasing the dimension of the covariance matrix and mean vector. This can be done by augmenting the existing covariance matrix and mean vector. The initial values of the extra elements can be set using a similar idea to that used in sub-step 501 and its alternative embodiments.

Incorporation of Technological Advances

Additional embodiments are possible that take advantage of changes in technology. As the size of available RAM 406 increases then more data can be stored in RAM. If the RAM is sufficiently large it may negate the requirement for continual retrieval from the HDD 404. Furthermore, as Graphics Processing Units (GPUs) become increasing popular many of the operations can be performed on a GPU rather than a CPU.

Advantages

The embodiments of the method and apparatus disclosed here alleviate to a great extent disadvantages associated with the prior-art. The prior-art matrix factorization approach is poorly defined and it can be difficult to repeat results obtained by others. In contrast to the prior-art, the method and apparatus presented here is well defined and repeatable. As such the embodiments disclosed here will perform well "out of the box" without requiring additional optimization.

In the prior-art, addition of new users and new products required extensive re-estimation. In the embodiments disclosed here, prediction of ratings for new users requires no re-estimation whatsoever. To add new products requires increasing the dimension of the mean and covariance. This is a simple, procedure and is substantially easier than what is required in prior-art.

The performance of the embodiments disclosed here are better than prior-art. One method to compare performance is to test approaches using the same data-matrix 101. An example of an appropriate data-matrix is that provided by Netflix. This data which contains a plurality of movie ratings from a plurality of users. An embodiment presented here achieves an RMSE of 0.8907 on the Netflix data. It is reported that plain matrix factorization achieves a significantly worse RMSE of 0.902 on this data.

Conclusions, Ramifications and Scope

From the foregoing description, it will thus be evident that the present application details a method and apparatus for product recommendation. As various changes can be made in the above embodiments and operating methods without departing from the spirit or scope of the following claims, it is intended that all matter contained in the above description or shown in the accompanying drawings should be interpreted as illustrative and not in a limiting sense.

Variations or modifications to the design and construction of, within the scope of the appended claims, may occur to those skilled in the art upon reviewing the disclosure herein. Such variations or modifications, if within the spirit of this invention, are intended to be encompassed within the scope of any claims to patent protection issuing upon this invention.

I claim:

1. A method of predicting a product rating comprising steps of:
   retaining a set of observed product ratings on a computer storage device;
   accessing the set from the computer storage device;
   calculating a mean vector, via a computer processor;
   estimating a single covariance matrix from the set;
   initializing the covariance matrix using the equation $R = N^{-1/2} S N^{-1/2}$, where S denotes an un-normalized sample covariance matrix and elements of the diagonal matrix N denote the number of times each product was rated;
   predicting a product rating using the mean vector and the covariance matrix when the product rating is absent from the set; and
   providing the product rating to an end user.

2. The method of claim 1, wherein the mean vector is estimated using a stochastic gradient descent approach.

3. The method of claim 1, wherein the covariance matrix is estimated using a stochastic gradient descent approach.

4. The method of claim 1, wherein the prediction of product rating by the given user is accomplished using a minimum means squared error predictor.

5. The method of claim 1, wherein calculations are performed using basic linear algebra subroutines.

6. The method of claim 1, wherein the covariance matrix is estimated using an expectation maximization algorithm.

7. The method of claim 1, further comprising the step of continuously updating the estimation of the covariance matrix.

8. The method of claim 7, further comprising the step of checking for convergence and if there is convergence halting the continuous updating of the estimation of the covariance matrix and saving the estimated mean vector and covariance matrix.

9. The method of claim 1, further comprising the step of calculating a confidence rating from at least one portion of the covariance matrix.

10. A method of predicting a product rating comprising steps of:
- retaining a set of observed product ratings on a computer storage device;
- accessing the set from the computer storage device;
- calculating a mean vector using a stochastic gradient descent approach, via a computer processor, corresponding to a mean of the set;
- initializing a single covariance matrix using the equation $R=N^{-1/2}SN^{-1/2}$ where S denotes an un-normalized sample covariance matrix and elements of the diagonal matrix N denote the number of times each product was rated, and
- estimating the single covariance matrix from the set using a stochastic gradient descent approach; predicting a product rating using the mean vector and the covariance matrix wherein the product rating is absent from the set; and
- providing the product rating to an end user.

11. A method of predicting a product rating comprising steps of:
- retaining a set of observed product ratings on a computer storage device;
- accessing the set from the computer storage device;
- estimating a covariance matrix from the set using the equation $R=N^{-1/2}SN^{-1/2}$ where S denotes an un-normalized sample covariance matrix and elements of the diagonal matrix N denote the number of times each product was rated,
- predicting a product rating using the covariance matrix when the product rating is absent from the set; and
- providing the product rating to an end user.

\* \* \* \* \*